United States Patent
Hirota et al.

(10) Patent No.: US 10,765,953 B1
(45) Date of Patent: Sep. 8, 2020

(54) INFORMATION PROCESSING SYSTEM, INFORMATION PROCESSING METHOD, INFORMATION PROCESSING APPARATUS, AND NON-TRANSITORY STORAGE MEDIUM HAVING STORED THEREIN INFORMATION PROCESSING PROGRAM

(71) Applicant: NINTENDO CO., LTD., Kyoto (JP)

(72) Inventors: Naoya Hirota, Kyoto (JP); Daisuke Nakamura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/867,190

(22) Filed: May 5, 2020

Related U.S. Application Data

(62) Division of application No. 16/122,985, filed on Sep. 6, 2018, now Pat. No. 10,682,576.

(30) Foreign Application Priority Data

Dec. 27, 2017 (JP) .................................. 2017-251768

(51) Int. Cl.
*H04M 1/66* (2006.01)
*A63F 13/795* (2014.01)
(Continued)

(52) U.S. Cl.
CPC .......... *A63F 13/795* (2014.09); *A63F 13/215* (2014.09); *A63F 13/35* (2014.09);
(Continued)

(58) Field of Classification Search
CPC ...... A63F 13/795; A63F 13/35; A63F 13/533; A63F 13/73; G06F 3/16; G06F 15/173;
(Continued)

(56) References Cited

U.S. PATENT DOCUMENTS

| 6,061,793 A | * | 5/2000 | Tewfik | ................... G10L 19/02 375/E7.167 |
| 8,212,854 B2 | | 7/2012 | Marton | |

(Continued)

FOREIGN PATENT DOCUMENTS

| CA | 2871916 | 11/2013 |
| EP | 2624234 | 8/2013 |

(Continued)

OTHER PUBLICATIONS

"How to add LINE via Bluetooth and Ultrasonic", http://android-appcenter.blogspot.com/2015/09/how-to-add-line-via-bluetooth-and.html, Sep. 16, 2015, 3 pages.

(Continued)

*Primary Examiner* — Mahendra R Patel
(74) *Attorney, Agent, or Firm* — Nixon & Vanderhye, P.C.

(57) ABSTRACT

An example of an information processing system includes a plurality of information processing terminals and a server. One terminal outputs an inaudible sound, thereby transmitting a user ID to the other terminal. The other terminal senses the inaudible sound and distinguishes the user ID of the one terminal in accordance with the inaudible sound. Based on the distinguished user ID, the other terminal acquires user information from the server and displays the acquired user information. The other terminal transmits a friend request to the server. When receiving friend requests from both terminals, the server stores the user IDs of both terminals in association with each other.

19 Claims, 12 Drawing Sheets

(51) Int. Cl.
*A63F 13/215* (2014.01)
*A63F 13/71* (2014.01)
*G06F 3/16* (2006.01)
*A63F 13/533* (2014.01)
*A63F 13/35* (2014.01)
*A63F 13/73* (2014.01)

(52) U.S. Cl.
CPC ............ *A63F 13/533* (2014.09); *A63F 13/71* (2014.09); *A63F 13/73* (2014.09); *G06F 3/167* (2013.01); *A63F 2300/6063* (2013.01)

(58) Field of Classification Search
CPC .......... H04M 1/66; H04M 19/04; H04M 3/42; H04M 1/663; H04B 1/38; H04N 7/15; H04L 29/06; H04W 4/02; G06Q 30/00; G06K 9/00; G06K 9/36; G08B 1/08
USPC .......... 455/410, 414.1, 416; 370/395.2, 494; 705/44, 71
See application file for complete search history.

(56) References Cited

U.S. PATENT DOCUMENTS

| | | | |
|---|---|---|---|
| 8,738,763 | B2 | 5/2014 | Crystal |
| 9,177,186 | B1* | 11/2015 | Rinehart ............. G06Q 10/087 |
| 9,591,148 | B2 | 3/2017 | Dimitroff |
| 9,794,620 | B2* | 10/2017 | Kim ................. H04N 21/41407 |
| 2003/0109288 | A1* | 6/2003 | Carley .................. H04M 1/663 |
| | | | 455/567 |
| 2004/0022272 | A1* | 2/2004 | Rodman ............. H04M 1/6025 |
| | | | 370/494 |
| 2004/0127199 | A1* | 7/2004 | Kagan .................... H04H 60/63 |
| | | | 455/414.1 |
| 2005/0018687 | A1* | 1/2005 | Cutler ............... H04L 29/06027 |
| | | | 370/395.2 |
| 2005/0207617 | A1* | 9/2005 | Sarnoff ................. G01S 13/878 |
| | | | 382/103 |
| 2007/0157257 | A1* | 7/2007 | Kagan ..................... H04W 4/06 |
| | | | 725/75 |
| 2009/0111443 | A1* | 4/2009 | Gupta ............... H04M 1/72519 |
| | | | 455/416 |
| 2011/0191253 | A1* | 8/2011 | Pilskalns ............ G06Q 20/3829 |
| | | | 705/71 |
| 2012/0084131 | A1* | 4/2012 | Bergel .................. G06F 16/955 |
| | | | 705/14.26 |
| 2012/0233255 | A1 | 9/2012 | Nishina |
| 2013/0203345 | A1* | 8/2013 | Fisher .................... H04W 52/02 |
| | | | 455/41.1 |
| 2014/0073362 | A1* | 3/2014 | Kawata .................. G06Q 50/01 |
| | | | 455/456.3 |
| 2014/0108252 | A1* | 4/2014 | Itwaru ................ G06Q 20/3276 |
| | | | 705/44 |
| 2016/0162880 | A1 | 6/2016 | Takeuchi et al. |
| 2016/0301810 | A1* | 10/2016 | Dimitroff ................. G01S 3/80 |
| 2016/0380991 | A1 | 12/2016 | Tsuda et al. |
| 2017/0153117 | A1* | 6/2017 | Kawase ............. H04N 21/4722 |
| 2019/0192976 | A1 | 6/2019 | Hirota |

FOREIGN PATENT DOCUMENTS

| | | | |
|---|---|---|---|
| GB | 201512444 | | 8/2015 |
| JP | 2003-036235 | | 2/2003 |
| JP | 2012-252371 | | 12/2012 |
| JP | 2012252371 | A * | 12/2012 |
| JP | 2013-008109 | | 1/2013 |
| JP | 2015-041372 | | 3/2015 |
| JP | 2015-177201 | | 10/2015 |
| JP | 2016-092670 | | 5/2016 |
| JP | 2016-110462 | | 6/2016 |
| JP | 2017-12287 | | 1/2017 |
| KR | 101560798 | | 10/2015 |
| KR | 101560798 | B1 * | 10/2015 |
| WO | 0031952 | | 6/2000 |
| WO | WO-0031952 | A1 * | 6/2000 ......... H04M 11/022 |
| WO | WO 2011/030733 | | 3/2011 |

OTHER PUBLICATIONS

Hz, http://hz.matataki.team/, 2016 with its English translation, 3 pages.

Office Action dated Dec. 18, 2019 issued in corresponding Japanese Application No. 2017-251768, 7 pages.

Notice of Reasons for Refusal dated Mar. 4, 2020 in corresponding Japanese Application No. 2017-251768, 7 pages.

\* cited by examiner

SOUND CONVERSION TABLE

| STEP | FREQUENCY (Hz) | N-TH BIT | VALUE |
|---|---|---|---|
| M1 | 18k | 1 | 0 |
| M2 | 18k+$\alpha$ | 1 | 1 |
| M3 | 18k+2$\alpha$ | 2 | 0 |
| M4 | 18k+3$\alpha$ | 2 | 1 |
| M5 | 18k+4$\alpha$ | 3 | 0 |
| M6 | 18k+5$\alpha$ | 3 | 1 |
| M7 | 18k+6$\alpha$ | 4 | 0 |
| M8 | 18k+7$\alpha$ | 4 | 1 |

US 10,765,953 B1

INFORMATION PROCESSING SYSTEM, INFORMATION PROCESSING METHOD, INFORMATION PROCESSING APPARATUS, AND NON-TRANSITORY STORAGE MEDIUM HAVING STORED THEREIN INFORMATION PROCESSING PROGRAM

CROSS REFERENCE TO RELATED APPLICATION

This application is a divisional of application Ser. No. 16/122,985, filed Sep. 6, 2018, which claims priority to Japanese Patent Application No. 2017-251768, filed on Dec. 27, 2017, each of which is incorporated herein by reference.

FIELD

An exemplary embodiment relates to an information processing system, an information processing method, an information processing apparatus, and a non-transitory storage medium having stored therein an information processing program for performing communication using an inaudible sound.

BACKGROUND AND SUMMARY

Conventionally, there is an information processing system where, when terminals acquire pieces of position information and have a predetermined positional relationship with each other, pieces of information regarding users of the respective terminals are stored in association with each other in a server.

In the above conventional technique, however, it is necessary to detect the pieces of position information of the terminals. Thus, there is room for improvement in transmitting or receiving pieces of identification information for identifying users by a simpler method.

Therefore, it is an object of the exemplary embodiment to provide an information processing system capable of transmitting or receiving pieces of identification information for identifying users by a simple method, and of storing the users in association with each other in a server using the pieces of identification information.

To achieve the above object, the exemplary embodiment employs the following configurations.

An example of the exemplary embodiment is an information processing system including a first terminal operated by a first user, a second terminal operated by a second user, and a server capable of communicating with the first terminal and the second terminal. The first terminal, using an inaudible sound, transmits first identification information allowing identification of the first user; and using an inaudible sound, receives second identification information allowing identification of the second user from the second terminal. The second terminal transmits the second identification information using an inaudible sound; and receives the first identification information from the first terminal using an inaudible sound. The server, when the first terminal receives the second identification information, and the second terminal receives the first identification information, stores the first user and the second user in association with each other in a storage section using the first identification information and the second identification information.

Based on the above, through inaudible communication, it is possible to transmit second identification information from a second terminal to a first terminal and transmit first identification information from the first terminal to the second terminal. Then, using the first identification information and the second identification information, it is possible to store a first user and a second user in association with each other in a server. The first terminal and the second terminal can exchange identification information by a simple method using the inaudible communication. Thus, it is possible to store the pieces of identification information identifying the users in association with each other in the server.

Further, in another configuration, the first terminal, when transmitting the first identification information using the inaudible sound, may output a first audible sound.

Based on the above, when an inaudible sound is output, it is possible to output an audible sound. Consequently, even when the first identification information is to be transmitted through communication using the inaudible sound, it is possible to cause a user to recognize that the first identification information is to be transmitted.

Further, in another configuration, the first terminal may output the first audible sound by superimposing the first audible sound on the inaudible sound.

Based on the above, it is possible to output an audible sound by superimposing the audible sound on an inaudible sound. Thus, it is possible to cause the user to recognize that the inaudible sound is being output.

Further, in another configuration, the second terminal, when transmitting the second identification information using the inaudible sound, may output a second audible sound.

Based on the above, even when the second identification information is to be transmitted through communication using an inaudible sound, it is possible to cause a user to recognize that the second identification information is to be transmitted.

Further, in another configuration, the second terminal may output the second audible sound by superimposing the second audible sound on the inaudible sound.

Based on the above, it is possible to output an audible sound by superimposing the audible sound on the inaudible sound. Thus, it is possible to cause the user to recognize that the inaudible sound is being output.

Further, in another configuration, the first terminal, when transmitting the first identification information using the inaudible sound, may display an instruction related to a sound to the first user operating the first terminal on a display screen.

Based on the above, when the first identification information is to be transmitted, it is possible to instruct the first user. For example, it is possible to instruct the first user to adjust the sound volume of a speaker when an inaudible sound is output.

Further, in another configuration, the second terminal, when receiving the first identification information, may transmit to the server an acquisition request to acquire first user information regarding the first user corresponding to the first identification information. When receiving from the second terminal the acquisition request to acquire the first user information, the server may transmit the first user information to the second terminal. The second terminal may present to the second user the first user information acquired from the server.

Based on the above, when receiving the first identification information from the first terminal, the second terminal can acquire user information of the first user from the server. Consequently, the second user of the second terminal can confirm information of the first user and confirm that a partner of which identification information is to be stored in association with the second user is the first user.

Further, in another configuration, the first terminal, when receiving the second identification information, may transmit to the server an acquisition request to acquire second user information regarding the second user corresponding to the second identification information. When receiving from the first terminal the acquisition request to acquire the second user information, the server may transmit the second user information to the first terminal. The first terminal may present to the first user the second user information acquired from the server.

Based on the above, when receiving the second identification information from the second terminal, the first terminal can acquire user information of the second user from the server. Consequently, the first user of the first terminal can confirm information of the second user and confirm that a partner of which identification information is to be stored in association with the first user is the second user.

Further, in another configuration, when receiving the second identification information from the second terminal, the first terminal may transmit to the server a first request to store the first user and the second user in association with each other. When receiving the first identification information from the first terminal, the second terminal may transmit to the server a second request to store the first user and the second user in association with each other. When receiving the first request and the second request, the server may store the first user and the second user in association with each other in the storage section.

Based on the above, when a first request is transmitted from the first terminal, and a second request is transmitted from the second terminal, it is possible to store the first user and the second user in association with each other. Consequently, with the intentions of both the first user and the second user, it is possible to store the first user and the second user in association with each other in the server.

Further, in another configuration, when receiving the second identification information from the second terminal, the first terminal may transmit the first request to the server in accordance with a predetermined operation performed by the first user. When receiving the first identification information from the first terminal, the second terminal may transmit the second request to the server in accordance with a predetermined operation performed by the second user.

Based on the above, in accordance with an operation of the first user, the first request is transmitted from the first terminal. In accordance with an operation of the second user, the second request is transmitted from the second terminal. Consequently, by the operations of both the first user and the second user, it is possible to store the first user and the second user in association with each other in the server.

Further, in another configuration, each of the first terminal and the second terminal may include a speaker and a microphone. Based on an operation of the first user, the first terminal may output a first inaudible sound corresponding to the first identification information from the speaker included in the first terminal, thereby transmitting the first identification information. Based on an operation of the second user, the second terminal may output a second inaudible sound corresponding to the second identification information from the speaker included in the second terminal, thereby transmitting the second identification information. The second terminal may sense the first inaudible sound using the microphone included in the second terminal, and acquire the first identification information based on the sensed first inaudible sound. The first terminal may sense the second inaudible sound using the microphone included in the first terminal, and acquire the second identification information based on the sensed second inaudible sound.

Based on the above, terminals can perform inaudible communication with each other using microphones and speakers included in the terminals and exchange identification information with each other.

Further, another exemplary embodiment is an information processing system including a first terminal operated by a first user, a second terminal operated by a second user, and a server capable of communicating with the first terminal and the second terminal. The first terminal, using an inaudible sound, transmits first identification information allowing identification of the first user. The second terminal receives the first identification information from the first terminal using the inaudible sound, and when receiving the first identification information from the first terminal, transmits to the server a request to store the first user and the second user in association with each other. The first terminal, when the request is transmitted to the server, transmits approval for the request to the server. The server, when receiving the approval, stores the first user and the second user in association with each other in a storage section using the first identification information and the second identification information.

Based on the above, a second terminal receives first identification information from a first terminal through inaudible communication. Consequently, the second terminal can transmit to a server a request to store a first user and a second user in association with each other. Further, when the second terminal transmits a request to the server, the first user can approve the request. With the intentions of both the first user and the second user, it is possible to store the first user and the second user in association with each other in the server.

Further, another exemplary embodiment may be an information processing method performed by an information processing system. Further, another exemplary embodiment may be a first terminal or a second terminal in the information processing system. Further, another exemplary embodiment may be a program executed by the first terminal, the second terminal, and the server.

According to the exemplary embodiment, terminals can transmit or receive pieces of identification information for identifying users through inaudible communication, and store the pieces of identification information in association with each other in a server.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
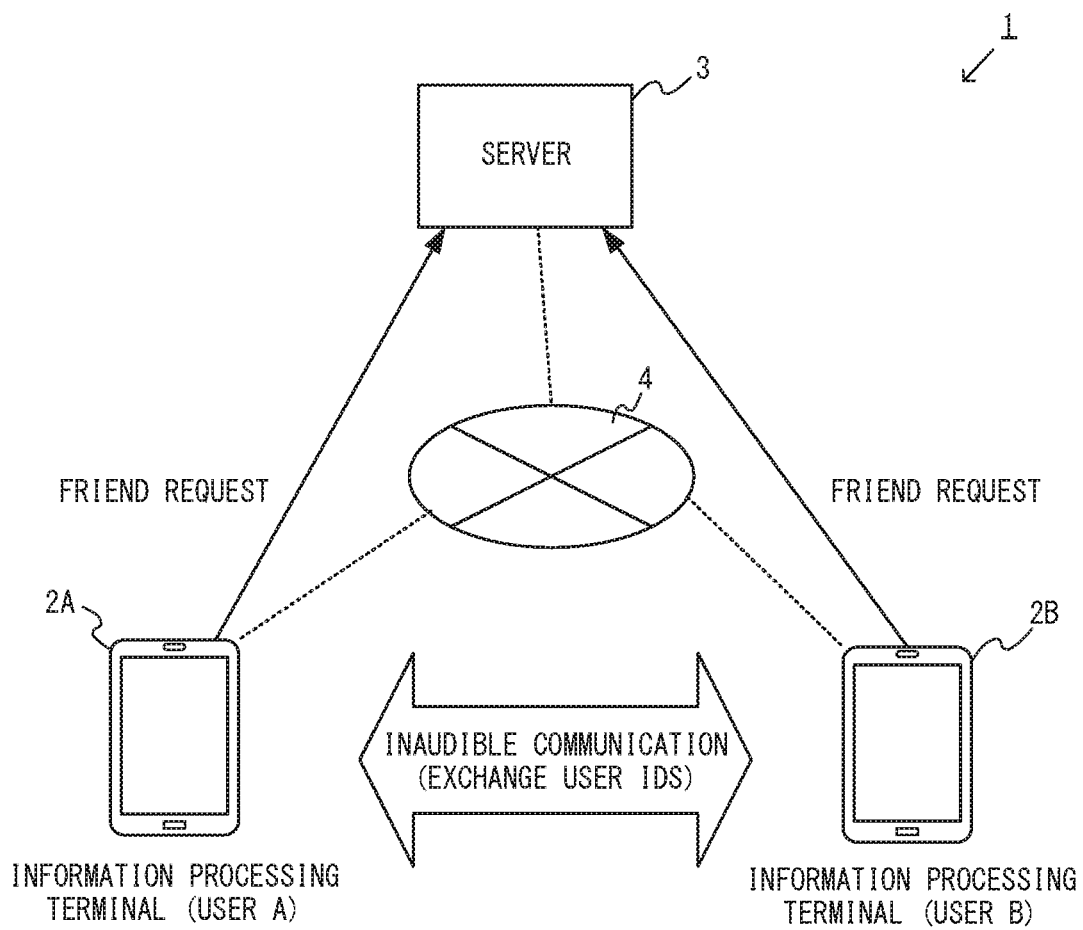
FIG. 1 is an example non-limiting diagram showing an example of the configuration of an information processing system 1 according to an exemplary embodiment.

A description is given below of an information processing system according to an example of an exemplary embodiment. FIG. 1 is a diagram showing an example of the configuration of an information processing system 1 according to the exemplary embodiment.

As shown in FIG. 1, the information processing system 1 includes an information processing terminal 2A, an information processing terminal 2B, and a server 3. The information processing terminal 2A is used by a user A, and the information processing terminal 2B is used by a user B. Hereinafter, the information processing terminals 2A and 2B are collectively referred to as an "information processing terminal 2". It should be noted that although FIG. 1 shows only two information processing terminals 2, the information processing system 1 includes many information processing terminals in addition to these.

The information processing terminal 2 can connect to a mobile communication network and/or a wireless LAN and can connect to the Internet 4 via the mobile communication network and/or the wireless LAN. The information processing terminal 2 can execute a game application described later. Further, the information processing terminal 2 can execute a game application other than the game application according to the exemplary embodiment, a browser application, an email application, and any other application. Further, the information processing terminal 2 includes a microphone and a speaker, and can input and output a sound. An example of the configuration of the information processing terminal 2 will be described later.

In the exemplary embodiment, as the information processing terminal 2, a mobile information processing apparatus such as a smartphone, a tablet terminal, a laptop personal computer, a mobile game apparatus, or a mobile phone may be used. Further, as the information processing terminal 2, a stationary information processing apparatus such as a personal computer or a home game apparatus may be used.

The server 3 is connected to the Internet 4 in a wired or wireless manner. The server 3 includes at least one processor, a memory, a storage device, and a communication section for connecting to a network.

The information processing terminal 2 communicates with the server 3 and thereby can execute a game application. Each user performs a game using the information processing terminal 2 of the user.

Figures 2, 3:
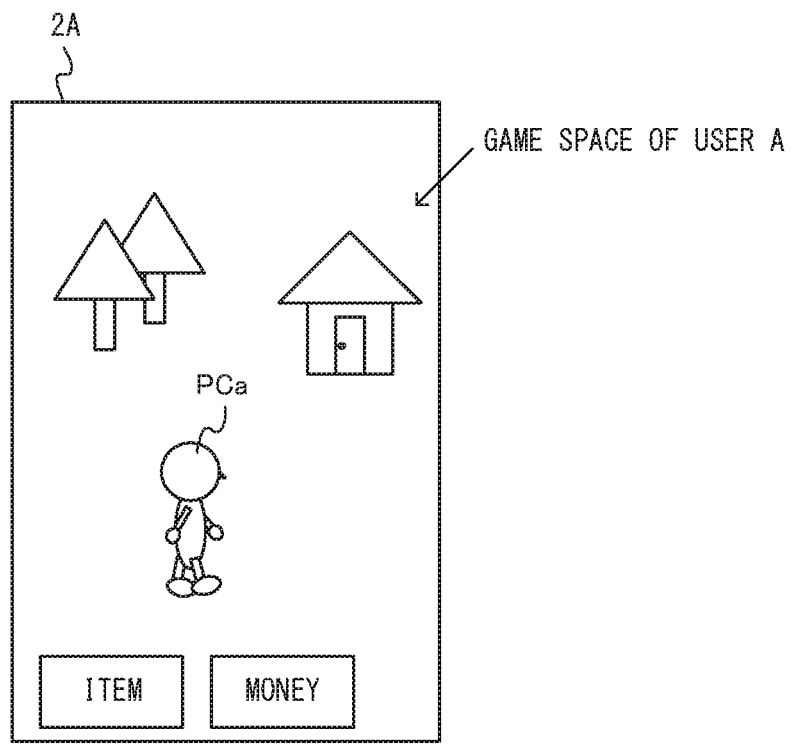
FIG. 2 is an example non-limiting diagram showing an example of a game image displayed on a screen of an information processing terminal 2A of a user A.
FIG. 3 is an example non-limiting diagram showing an example of user management information stored in a storage device of a server 3.

FIG. 2 is a diagram showing an example of a game image displayed on a screen of the information processing terminal 2A of the user A. As shown in FIG. 2, on the screen of the information processing terminal 2A, an image of a game space where the user A performs a game is displayed. On the screen of the information processing terminal 2A, a user character PCa corresponding to the user A is displayed. The user character PCa is a character unique to the user A and set (generated) by the user A themselves. Further, in the game space, various objects are placed. For example, the user A touches the screen of the information processing terminal 2A, thereby causing the user character PCa to move in the game space or causing the user character PCa to perform a predetermined action. For example, when the user A causes the user character PCa to perform a predetermined action (e.g., when the user A completes a mission corresponding to an instruction), the user A gains a predetermined item for advancing the game advantageously, or gains money that can be used in the game (in-game currency). The user A pays in-game currency in a shop present in the game space and thereby can purchase a predetermined item.

Further, the user B also performs a similar game using the information processing terminal 2B. The user B operates the information processing terminal 2B and thereby can cause a user character PCb corresponding to the user B to move in a game space or cause the user character PCb to perform a predetermined action.

In the exemplary embodiment, basically, using each information processing terminal 2, a closed game is performed in the information processing terminal. The user A performs a game by operating the user character PCa in a game space of the user A. The user B performs a game by operating the user character PCb in a game space of the user B.

In a game according to the exemplary embodiment, users can establish a friend relationship. Here, "establish a friend relationship" refers to storing the user ID of a certain user and the user ID of another user in association with each other in the server 3. Another user having a friend relationship with a certain user is referred to a "friend" of the certain user. A user can establish friend relationships with a plurality of users.

Here, a user ID is information for uniquely identifying a user and uniquely assigned to the user. For example, when the user A accesses the server 3 using the information processing terminal 2A and registers the user, a user ID is issued. The issued user ID is stored in the server 3 and also stored in the information processing terminal 2A.

Each user establishes a friend relationship with another user and thereby can cause a change in the game of the user. For example, in the game according to the exemplary embodiment, a special stage (or a special area in a game space) is prepared. The configuration is such that when the number of friends of the user A is equal to or greater than a predetermined number, the user A can perform the game at the special stage, and when the number of friends of the user A is less than the predetermined number, the user A cannot perform the game at the special stage. Further, for example, when the user A and the user B have a friend relationship, the user A can cooperate with the user character PCb of the user B to advance a game of the user A, or can cause the user character PCb of the user B to appear in the game of the user A. Further, when the user B decides to sell an item of the user B, the user A can purchase the item of the user B. When the user A purchases the item of the user B in a game performed using the information processing terminal 2A, money of the user B increases in a game of the user B performed using the information processing terminal 2B.

Hereinafter, a description is given of a method for establishing a friend relationship between the user A and the user B.

As shown in FIG. 1, the information processing terminal 2A and the information processing terminal 2B can communicate with each other through inaudible communication (also referred to as "ultrasonic communication"). Here, the inaudible communication is communication using a sound of a frequency that cannot be heard by a person or is difficult for a person to hear. The inaudible communication will be described in detail later.

In the information processing terminal 2A, the user ID of the user A (hereinafter referred to as a "user IDa") is stored. In the information processing terminal 2B, the user ID of the user B (hereinafter referred to as a "user IDb") is stored. The information processing terminal 2A acquires the user IDb of the user B from the information processing terminal 2B through the inaudible communication. Further, the information processing terminal 2B acquires the user IDa of the user A from the information processing terminal 2A through the inaudible communication.

When the information processing terminal 2A acquires the user IDb from the information processing terminal 2B, the information processing terminal 2A transmits to the server 3 a friend request to establish a friend relationship between the user A and the user B. Similarly, when the information processing terminal 2B acquires the user IDa from the information processing terminal 2A, the information processing terminal 2B transmits to the server 3 a friend request to establish a friend relationship between the user A and the user B. Here, "a friend request to establish a friend relationship between the user A and the user B" is a request to store the user IDa and the user IDb in association with each other in the server 3.

When the server 3 receives the friend requests from the information processing terminal 2A and the information processing terminal 2B, the server 3 stores the user IDa and the user IDb in association with each other. Consequently, a friend relationship is established between the user A and the user B.

FIG. 3 is a diagram showing an example of user management information stored in the storage device of the server 3. As shown in FIG. 3, with respect to each user ID, the server 3 stores the user name and the user ID of a user registered as a friend in association with the user ID. A "user name" is information for identifying a user and set by each user themselves. Further, the server 3 stores game data such as a user character, an item, and in-game currency in addition to the above information with respect to each user ID.

As shown in FIG. 3, for example, when a friend relationship is established between the user A and the user B, the server 3 stores the user IDb of the user B in association with the user IDa of the user A and stores the user IDa of the user A in association with the user IDb of the user B. Further, when the user B also has a friend relationship with the user C, the server 3 stores a user IDc of the user C in association with the user IDb and stores the user IDb in association with the user IDc.

Figure 4:
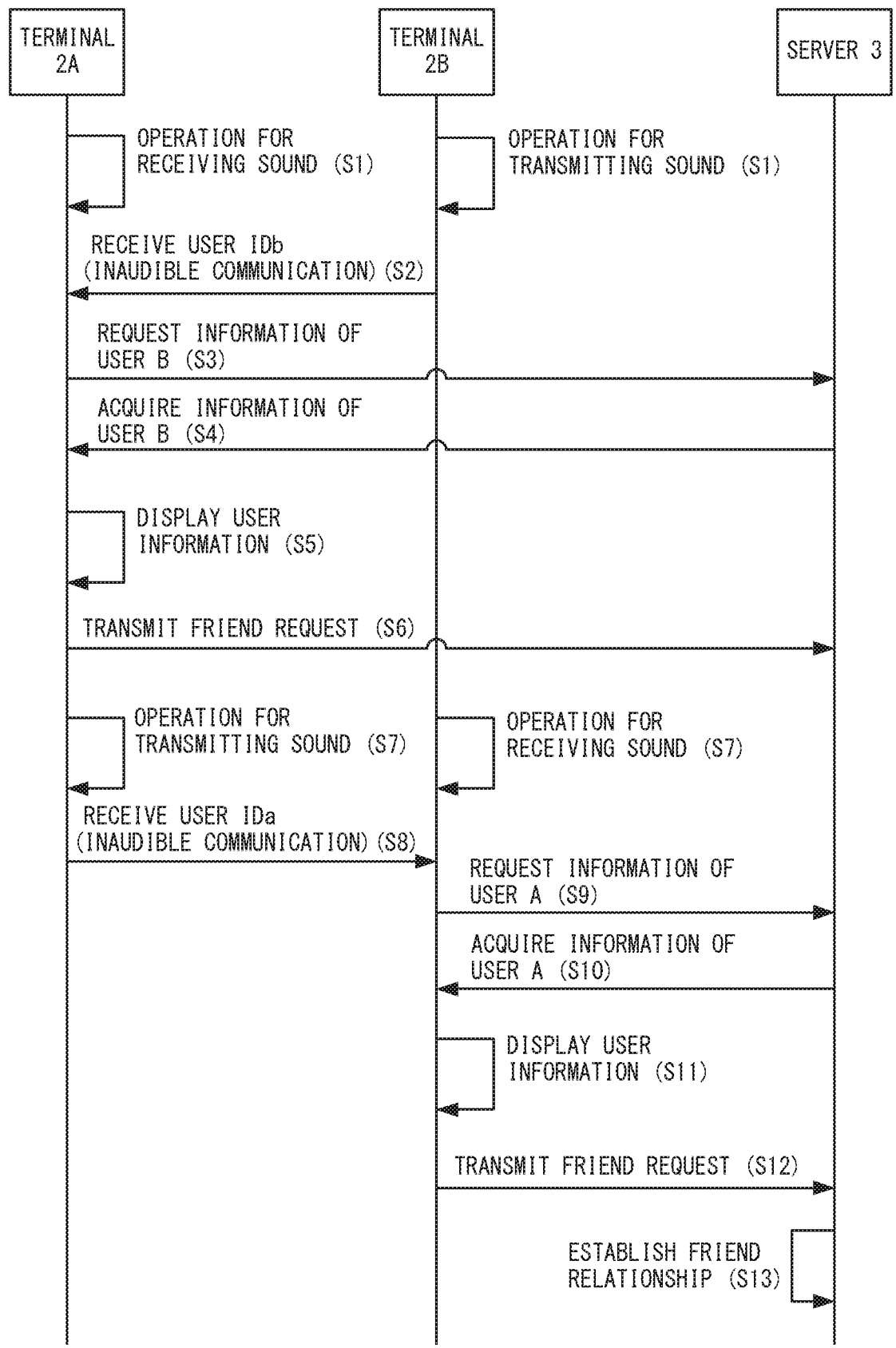
FIG. 4 is an example non-limiting diagram illustrating the flow of the processing performed until a friend relationship between the user A and a user B is established.

FIG. 4 is a diagram illustrating the flow of the processing performed until a friend relationship is established between the user A and the user B.

First, the user A and the user B bring the information processing terminals 2A and 2B relatively close to each other (e.g., several tens of centimeters to several meters) and perform an operation for transmitting or receiving an inaudible sound. For example, as shown in FIG. 4, the user A performs an operation for receiving an inaudible sound using the information processing terminal 2A, and the user B performs an operation for transmitting an inaudible sound using the information processing terminal 2B (step S1).

As a result, the information processing terminal 2B outputs an inaudible sound to the surroundings of the information processing terminal 2B, thereby transmitting the user IDb of the user B. It should be noted that the information processing terminal 2B outputs the inaudible sound and also outputs a sound effect (an audible sound). The information processing terminal 2A senses the inaudible sound from the information processing terminal 2B, thereby receiving the user IDb (step S2). When the information processing terminal 2A receives the user IDb of the user B, the information processing terminal 2A requests user information of the user B from the server 3 (step S3). In response to the request, the server 3 transmits the user information of the user B to the information processing terminal 2A, and the information processing terminal 2A acquires the user information of the user B transmitted from the server 3 (step S4). For example, the server 3 transmits, as the user information of the user B, the user name of the user B, data (e.g., image data) regarding the user character PCb, information indicating whether or not a friend relationship has already been established between the user A and the user B, and the like.

When a friend relationship is not established between the user A and the user B, next, the information processing terminal 2A displays the acquired user information of the user B on the screen and also displays an image for allowing the user A to select whether or not a friend relationship is to be established with the displayed user (step S5). Consequently, the user A can confirm that the user ID is received from the user B.

When the user A performs an operation for establishing a friend relationship with the user B, the information processing terminal 2A transmits to the server 3 a friend request to establish a friend relationship between the user A and the user B (step S6). The server 3 receives the friend request from the information processing terminal 2A and stores the friend request.

Next, an operation for transmitting an inaudible sound is performed in the information processing terminal 2A, and an operation for receiving an inaudible sound is performed in the information processing terminal 2B (step S7).

As a result, similarly to the above step S2, the information processing terminal 2A outputs an inaudible sound to the surroundings of the information processing terminal 2A, thereby transmitting the user IDa of the user A. Also here, the information processing terminal 2A outputs the inaudible sound and outputs a sound effect (an audible sound). The information processing terminal 2B senses the inaudible sound from the information processing terminal 2A, thereby receiving the user IDa (step S8). When the information processing terminal 2B receives the user IDa of the user A, the information processing terminal 2B requests user information of the user A from the server 3 (step S9). In response to the request, the server 3 transmits the user information of the user A (the user name of the user A, an image of the user character PCa of the user A, and the like) to the information processing terminal 2B, and the information processing terminal 2B acquires the user information of the user A transmitted from the server 3 (step S10).

Next, the information processing terminal 2B displays the acquired user information of the user A on the screen and also displays an image for allowing the user B to select whether or not a friend relationship is to be established with the user A (step S11).

When the user B performs an operation for establishing a friend relationship with the user A, the information processing terminal 2B transmits to the server 3 a friend request to establish a friend relationship between the user A and the user B (step S12).

When the server 3 receives the friend request from the information processing terminal 2A in step S6 and the friend request from the information processing terminal 2B in step S12, the server 3 establishes a friend relationship between the user A and the user B (step S13). Specifically, the server 3 stores the user IDa and the user IDb in association with each other in the storage device.

As described above, in the exemplary embodiment, each user transmits through the inaudible communication the user ID of the user to a partner with whom the user attempts to establish a friend relationship. Then, the user also receives the user ID from the partner. The user IDs are transmitted and received through the inaudible communication, whereby each user can easily exchange the user IDs with the partner without inputting the user ID of the partner by hand or capturing an image (e.g., a two-dimensional code) corresponding to the user ID of the partner with a camera, and can register the partner as a friend.

Figure 5:
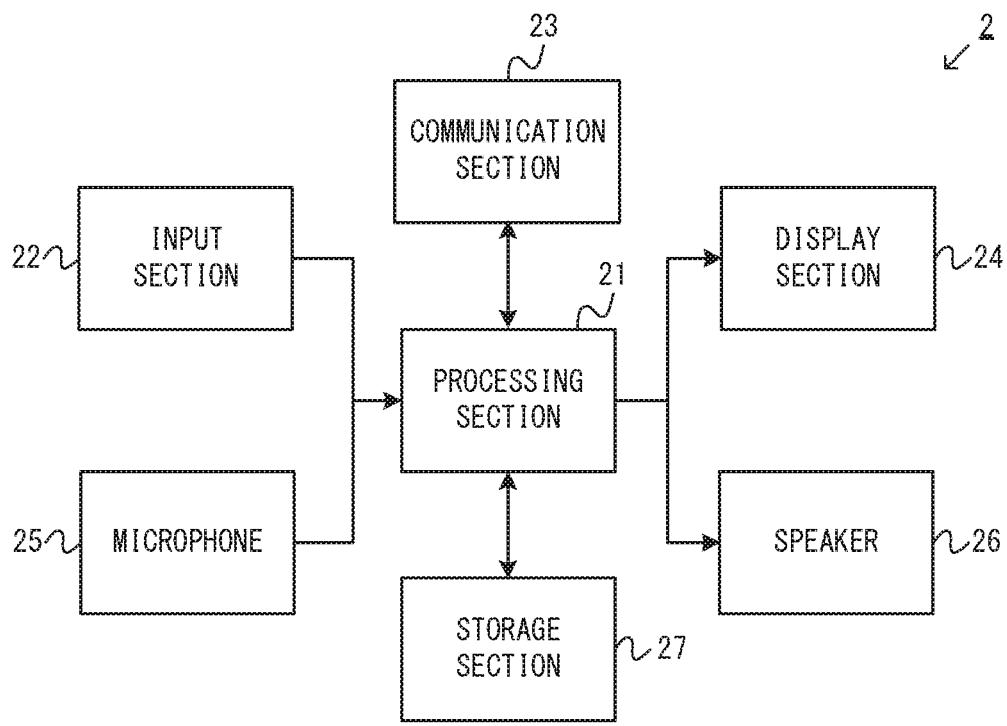
FIG. 5 is an example non-limiting diagram showing an example of the configuration of an information processing terminal 2.

Next, a description is given of the configuration of the information processing terminal 2. FIG. 5 is a diagram showing an example of the configuration of the information processing terminal 2. As shown in FIG. 5, the information processing terminal 2 includes a processing section 21, an input section 22, a communication section 23, a display section 24, a microphone 25, a speaker 26, and a storage section 27.

The processing section 21 includes at least one processor and a memory. The processing section 21 executes a game application or another application program or controls components. The input section 22 includes a touch panel and a button. Information of a user operation performed on the input section 22 is sent to the processing section 21, and the processing section 21 performs processing corresponding to the user operation. The communication section 23 includes an antenna and a communication circuit for connecting to a mobile communication network and/or a wireless LAN. The display section 24 is a display device for displaying a letter and an image, and for example, may be a liquid crystal display device or an organic EL display device. The storage section 27 is, for example, a non-volatile memory and stores a game application program, data for use in a game, another application program, and the like.

The microphone 25 converts a sound into an electric signal. The microphone 25 can detect a sound of a frequency higher than 20 Hz to 18 kHz, which is the human audible range. For example, the microphone 25 may be able to detect a sound up to 22 kHz, or may be able to detect a sound of a frequency equal to or higher than 22 kHz.

Further, the speaker 26 outputs a sound. The speaker 26 can output a sound of a frequency higher than 20 Hz to 18 kHz, which is the human audible range. For example, the speaker 26 may be able to output a sound up to 22 kHz, or may be able to output a sound of a frequency equal to or higher than 22 kHz.

Figure 6:
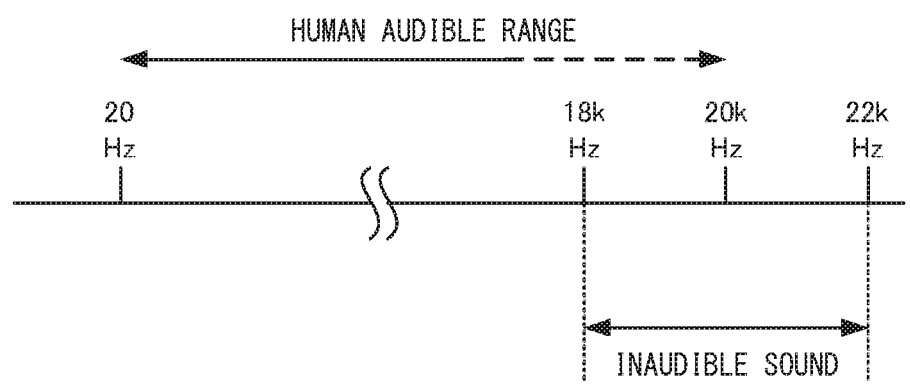
FIG. 6 is an example non-limiting diagram showing an example of the range of the frequency of an inaudible sound for use in inaudible communication in the exemplary embodiment.

FIG. 6 is a diagram showing an example of the range of the frequency of an inaudible sound for use in the inaudible communication in the exemplary embodiment. The human audible range has an individual difference. For example, there are a person capable of hearing a sound up to 20 kHz and also a person capable of only hearing a sound of a frequency of 15 kHz or lower. In the exemplary embodiment, a sound of 18 kHz or higher is defined as the "inaudible sound", regardless of whether or not the sound can actually be heard by a person. That is, the "inaudible sound" in the exemplary embodiment is a sound of a frequency that cannot be heard by a person or difficult for a person to hear. Even if there is a person capable of actually hearing a sound of 18 kHz, a sound of 18 kHz or higher is defined as the "inaudible sound". As shown in FIG. 6, in the exemplary embodiment, the range of the frequency of the inaudible sound for use in the inaudible communication is, for example, about 18 kHz to about 22 kHz. It should be noted that the range of the frequency of the inaudible sound for use in the inaudible communication is not limited to this. For example, the lower limit of the frequency may be 18 kHz or lower (e.g., 15 kHz), and the upper limit of the frequency may be 22 kHz or higher.

Figures 7, 8:
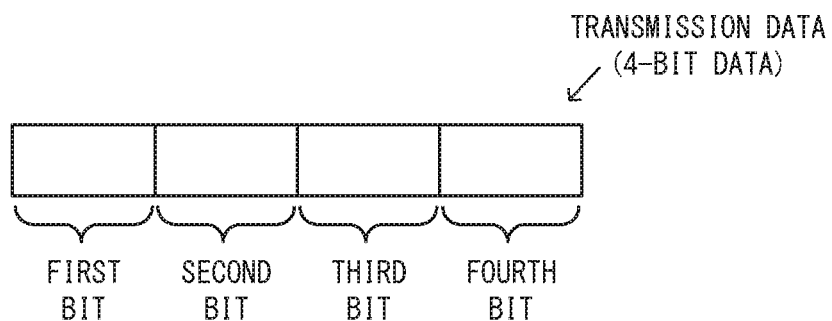
FIG. 7 is an example non-limiting diagram showing an example of data to be transmitted through the inaudible communication.
FIG. 8 is an example non-limiting diagram showing an example of a sound conversion table in which a sound and data are associated with each other.

Next, an overview of the inaudible communication is described. FIG. 7 is a diagram showing an example of data transmitted through the inaudible communication. FIG. 8 is a diagram showing an example of a sound conversion table in which a sound and data are associated with each other.

For example, as shown in FIG. 7, when 4-bit data is transmitted, a bit on the left side of the 4-bit data is a "first bit", a bit to the right of the first bit is a "second bit", a bit to the right of the second bit is a "third bit", and a bit to the right of the third bit is a "fourth bit".

As shown in FIG. 8, for example, a sound of a frequency of "18 k" Hz is a step "M1", and a sound of a frequency of "18 k+α" Hz is a step "M2". The step "M1" (18 kHz) and the step "M2" (18 k+α Hz) are assigned to the first bit, the step "M1" is defined as a value "0", and the step "M2" is defined as a value "1".

Further, for example, a sound of a frequency of "18 k+2α" Hz is a step "M3", and a sound of a frequency of "18 k+3α" Hz is a step "M4". The step "M3" (18 k+2α Hz) and the step "M4" (18 k+3α Hz) are assigned to the second bit, the step "M3" is defined as a value "0", and the step "M4" is defined as a value "1".

Further, for example, a sound of a frequency of "18 k+4α" Hz is a step "M5", and a sound of a frequency of "18 k+5α" Hz is a step "M6". The step "M5" (18 k+4α Hz) and the step "M6" (18 k+5α Hz) are assigned to the third bit, the step "M5" is defined as a value "0", and the step "M6" is defined as a value "1".

Further, for example, a sound of a frequency of "18 k+6α" Hz is a step "M7", and a sound of a frequency of "18 k+7α" Hz is a step "M8". The step "M7" (18 k+6α Hz) and the step "M8" (18 k+7α Hz) are assigned to the fourth bit, the step "M7" is defined as a value "0", and the step "M8" is defined as a value "1".

Each information processing terminal 2 stores in advance a sound conversion table in which a sound (a frequency) and data are thus associated with each other, and simultaneously plays four sounds, and thereby can transmit 4-bit data. For example, to transmit data "1000", the first bit is "1", the second bit is "0", the third bit is "0", and the fourth bit is "0". Thus, the information processing terminal 2 simultaneously plays "M2", "M3", "M5", and "M7" based on the sound conversion table in FIG. 8.

Figure 9:
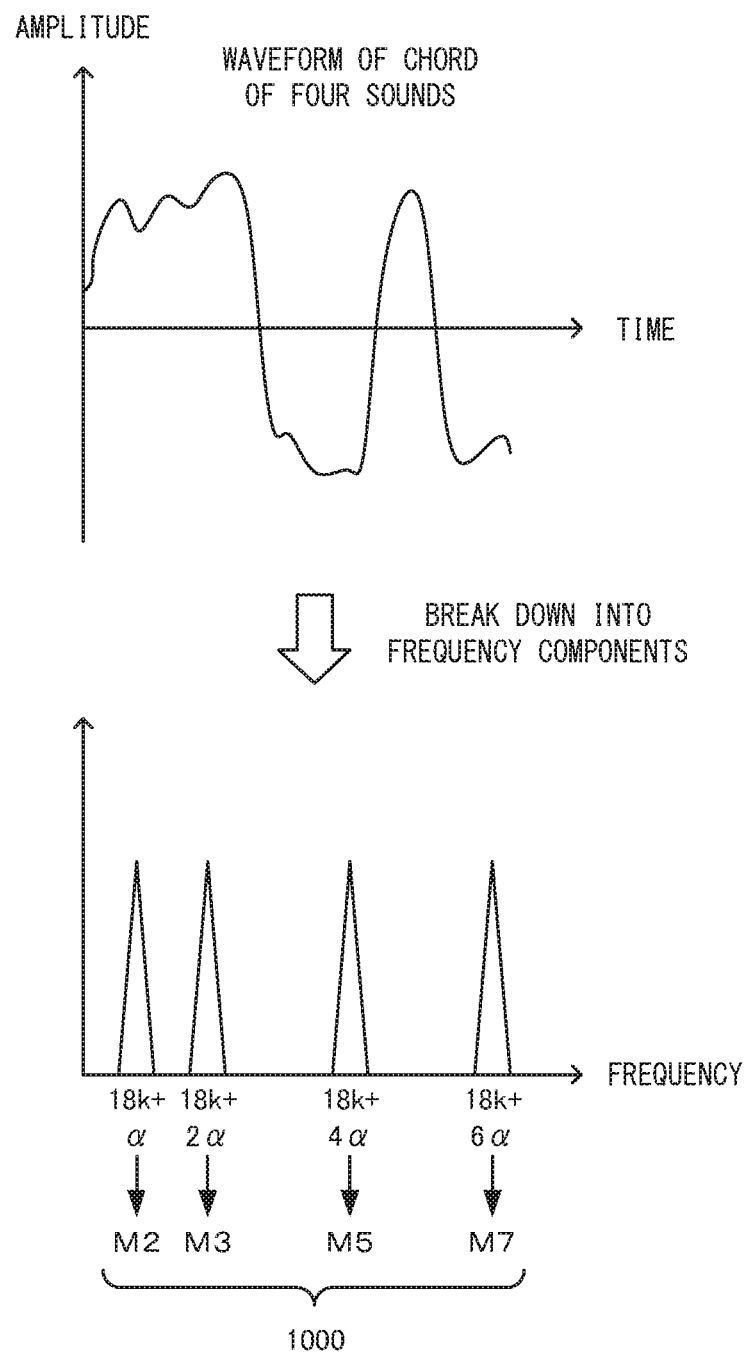
FIG. 9 is an example non-limiting diagram showing an overview of the processing performed when the information processing terminal 2 receives an inaudible sound.

The receiving side of the sound extracts each sound (frequency) from the chord of the plurality of sounds and demodulates data. FIG. 9 is a diagram showing an overview of the processing performed when the information processing terminal 2 receives an inaudible sound.

When the four sounds are simultaneously played, the information processing terminal 2 detects the complex waveform of the chord as shown in FIG. 9. The information processing terminal 2 performs predetermined conversion on this waveform, thereby extracting frequency components. For example, the information processing terminal 2 extracts frequency components using Fast Fourier Transform (a lower part of a diagram in FIG. 9). Then, the information processing terminal 2 determines the positions and the values of the bits corresponding to the extracted frequency components with reference to the sound conversion table in FIG. 8 and demodulates the data "1000".

It should be noted that the sound conversion table shown in FIG. 8 is a mere example. Alternatively, another sound conversion table may be used. Further, the number of bits of data to be transmitted by the output of sounds provided one time is a mere example, and is not limited to 4 bits.

Next, the details of the processing performed by the information processing terminal 2 and the server 3 are described.

Figure 10:
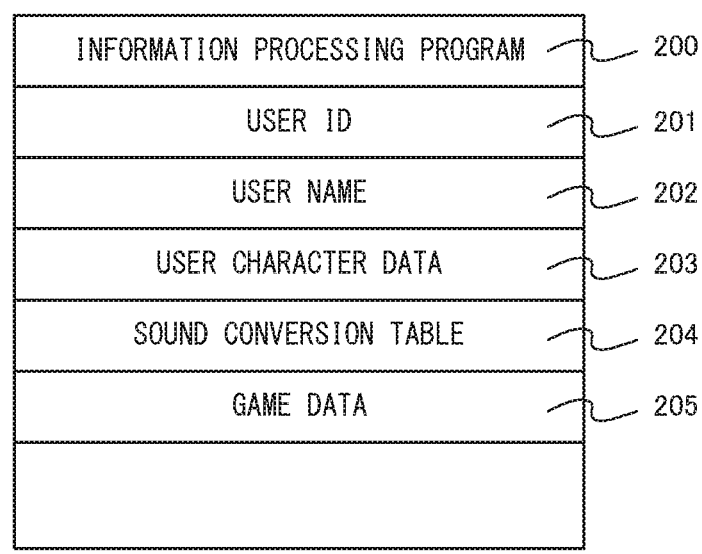
FIG. 10 is an example non-limiting diagram showing an example of data stored in a memory of the information processing terminal 2.

FIG. 10 is a diagram showing an example of data stored in the memory of the information processing terminal 2. As shown in FIG. 10, the memory of the information processing terminal 2 stores an information processing program 200, a user ID 201, a user name 202, user character data 203, a sound conversion table 204, and game data 205.

The information processing program 200 is a program for executing the above game application. For example, the information processing program 200 is stored in the storage section 27, read from the storage section 27 when the game application is executed, and stored in the memory of the processing section 21. The information processing program 200 includes various programs for executing a game, and a program for performing the inaudible communication.

The user ID 201 is data for identifying the user of the information processing terminal 2 and for example, is data represented by a 10-digit number.

The user name 202 is data for identifying the user of the information processing terminal 2 and is data represented by a character string determined by the user.

The user character data 203 is data regarding the user character corresponding to the user of the information processing terminal 2 and for example, is data representing the face, the appearance, the clothing, and the like of the character.

The sound conversion table 204 is the table exemplified in FIG. 8 in which a sound (a frequency) and data are associated with each other.

The game data 205 is data referenced when the game according to the exemplary embodiment is executed, and for example, includes data of a map of a game space, data regarding another character (a non-player character) in the game space, data regarding an object in the game space, data regarding an item, data regarding in-game currency, and the like.

(Details of Processing of Information Processing Terminal 2)

Figure 11:
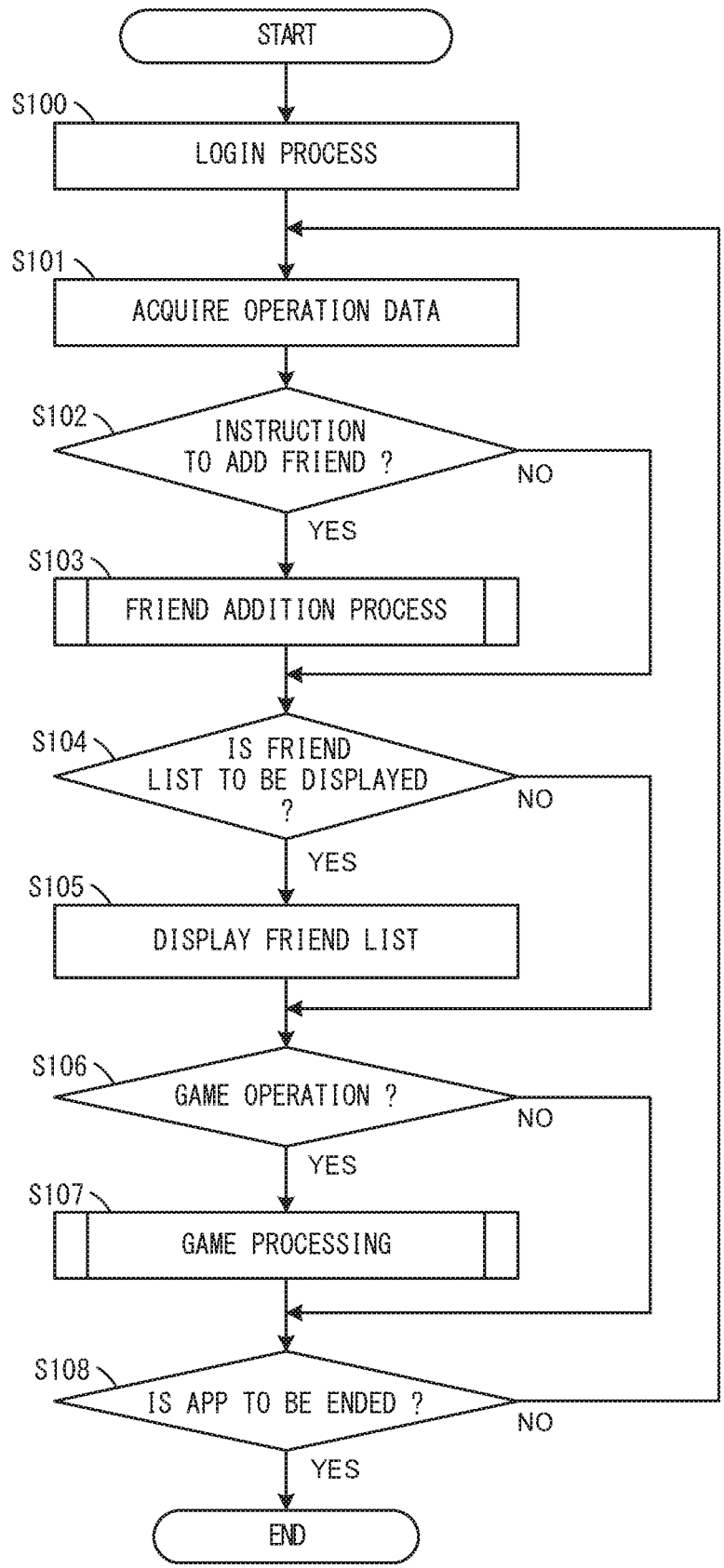
FIG. 11 is an example non-limiting flow chart showing the details of the processing performed by the information processing terminal 2.

FIG. 11 is a flow chart showing the details of the processing performed by the information processing terminal 2. When an instruction to execute the game application according to the exemplary embodiment is given in the information processing terminal 2, the processing shown in FIG. 11 is started. The processing shown in FIG. 11 is performed by the processing section 21 of the information processing terminal 2 executing the information processing program 200.

As shown in FIG. 11, first, the information processing terminal 2 accesses the server 3 via the Internet and executes a login process (step S100). Specifically, the information processing terminal 2 logs into the server 3 using the user ID. It should be noted that when the information processing terminal 2 logs in, the information processing terminal 2 may cause the user to input a password, or may automatically log in without inputting a password. When the information processing terminal 2 logs in, the server 3 transmits information necessary for a game to the information processing terminal 2. For example, the user name, user character data, data of a map of a game space, data regarding another character in the game space, data regarding an object in the game space, and the like are downloaded to the information processing terminal 2, and the above information is stored as the game data 205 in the memory. Then, in the information processing terminal 2, the game space is set, the user character, another character (a non-player character), an object, and the like are placed in the game space, and the game is started.

Subsequently, the information processing terminal 2 acquires operation data corresponding to an operation performed on the input section 22 by the user (step S101). Next, based on the operation data, the information processing terminal 2 determines whether or not the user gives an instruction to add a friend (step S102). After the login process is performed, a game image is displayed on the display section 24. For example, the game image includes an icon for adding a friend. When the icon is tapped by the user, the information processing terminal 2 determines in step S102 that an instruction to add a friend is given.

When an instruction to add a friend is given (step S102: YES), the information processing terminal 2 executes a friend addition process (step S103). The details of the friend addition process will be described later.

When the determination is NO in step S102, or when the process of step S103 is performed, the information processing terminal 2 determines whether or not a friend list is to be displayed (step S104). For example, when a new friend is added in step S103, the information processing terminal 2 determines in step S104 that the friend list is to be displayed. Further, the game image includes an icon for displaying the friend list. When the icon is tapped by the user, the information processing terminal 2 determines in step S104 that the friend list is to be displayed.

When it is determined that the friend list is to be displayed (step S104: YES), the information processing terminal 2 accesses the server 3, acquires pieces of friend information (e.g., the user names of friends, images of user characters, and the like), and displays a list of the pieces of friend information (step S105). For example, when the user A has friend relationships with the user B and the user C, then based on the user IDa, the information processing terminal 2A of the user A acquires, from the server 3, pieces of information (the user names, images of user characters, and the like) of the user B and the user C registered as friends of the user A and displays these pieces of information.

When the determination is NO in step S104, or when the process of step S105 is performed, the information processing terminal 2 determines whether or not a game operation is performed (step S106). Here, it is determined whether or not a game operation for performing the game, which is different from the above instruction to add a friend or the above instruction to display the friend list, is performed.

When a game operation is performed (step S106: YES), the information processing terminal 2 executes game processing (step S107). The details of the game processing will be described later.

When the determination is NO in step S106, or when the process of step S107 is performed, the information processing terminal 2 determines whether or not the game application is to be ended (step S108). When it is determined that the game application is not to be ended (step S108: NO), the processing returns to step S101. It should be noted that the information processing terminal 2 repeatedly executes the processes of steps S101 to S108 at predetermined time intervals.

When, on the other hand, the user gives an instruction to end the game, the information processing terminal 2 determines that the game application is to be ended (step S108: YES), and the information processing terminal 2 ends the processing shown in FIG. 11.

(Friend Addition Process)

Figure 12:
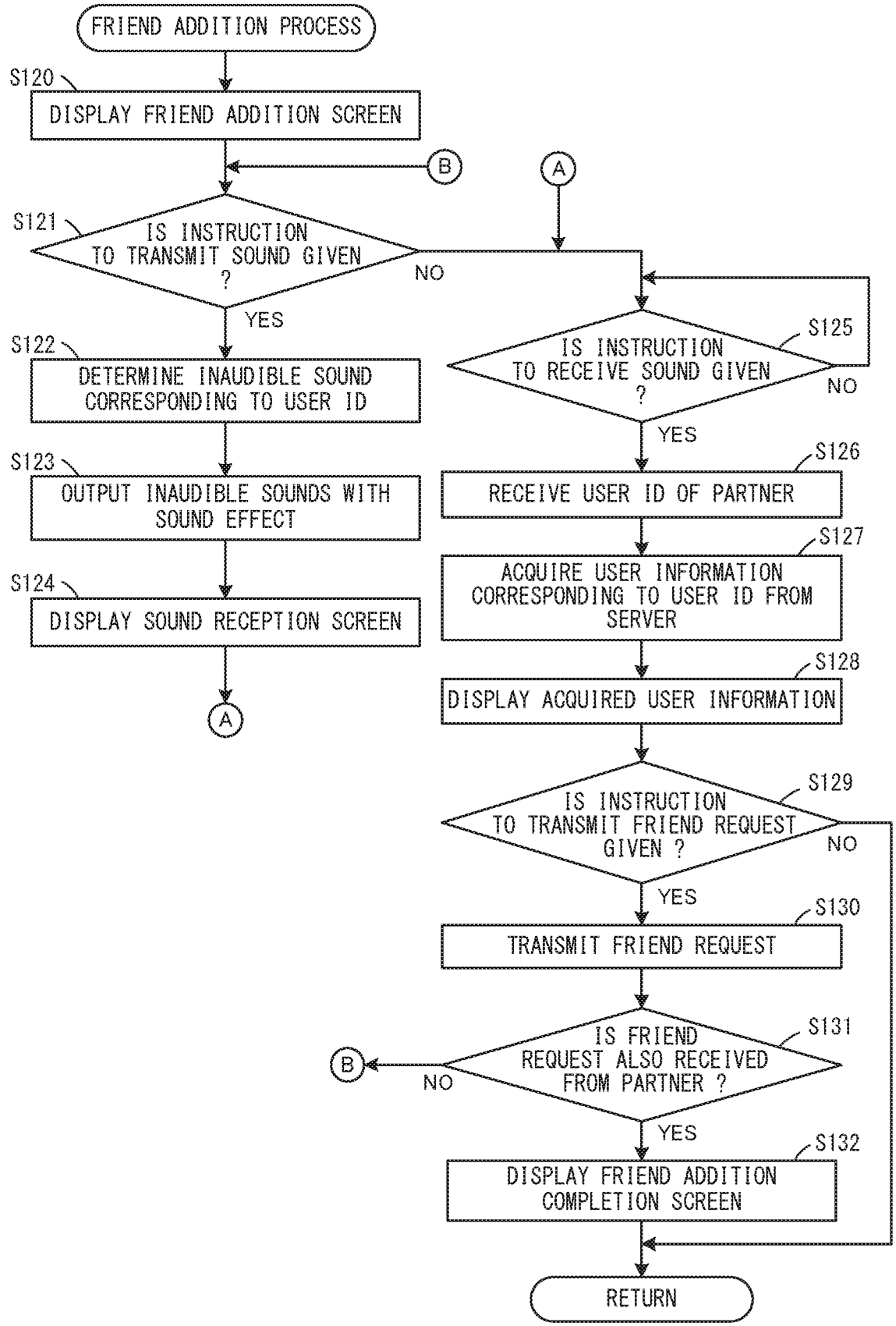
FIG. 12 is an example non-limiting flow chart showing the details of a friend addition process in step S103.

Next, the details of the friend addition process in step S103 in FIG. 11 are described. FIG. 12 is a flow chart showing the details of the friend addition process in step S103.

First, the information processing terminal 2 displays a friend addition screen (step S120). For example, the friend addition screen displays an image for allowing the user to select whether the information processing terminal 2 is to transmit a sound or receive a sound.

It should be noted that the friend addition screen gives the user a predetermined warning. For example, before an inaudible sound is received, the screen of the display section 24 may display, to the user, letters indicating that the microphone 25 is to be used. For example, before an inaudible sound is received, an instruction to set the microphone 25 to ON may be displayed to the user. Further, before an inaudible sound is output, letters indicating that the speaker 26 is to be used may be displayed. For example, letters for confirming with the user whether or not a sound can be output to the surroundings may be displayed. Further, for example, display for confirming with the user whether the sound volume of the speaker 26 is "0" (i.e., mute) may be performed. Further, an instruction to adjust the sound volume of the speaker 26 (e.g., an instruction such as "Please increase the sound volume of the speaker.") may be displayed. When the sound volume of the speaker 26 is set to "0" in the setting of the main body of the information processing terminal 2, the speaker outputs neither an audible sound nor an inaudible sound. Thus, before outputting an inaudible sound, the information processing terminal 2 performs display for confirming with the user whether the sound volume of the speaker 26 is set to "0" in the setting of the main body of the information processing terminal 2 (displays an instruction to set the speaker to ON).

It should be noted that these predetermined warnings may be given when the determination is YES in the next step S121. For example, when the determination is YES in step S121 (before an inaudible sound is output), letters indicating that the speaker 26 is to be used, or an instruction to adjust the sound volume of the speaker 26 may be displayed. Further, when the determination is YES in step S125 described later, an instruction to set the microphone 25 to ON may be displayed to the user.

After step S120, the information processing terminal 2 determines whether or not an instruction to transmit a sound is given by the user (step S121). When an instruction to transmit a sound is given (step S121: YES), the information processing terminal 2 determines an inaudible sound corresponding to the user ID (step S122).

Specifically, in step S122, based on the user ID of the user of the information processing terminal 2 and using the sound conversion table shown in FIG. 8, the information processing terminal 2 determines a plurality of inaudible sounds to be output. For example, the information processing terminal 2 breaks down the user ID into two streams of bits and determines a plurality of inaudible sounds corresponding to the stream of bits of the first half and a plurality of inaudible sounds corresponding to the stream of bits of the second half.

After step S122, the information processing terminal 2 simultaneously outputs the plurality of inaudible sounds determined in step S122 and also outputs a sound effect from the speaker 26 (step S123). For example, the information processing terminal 2 outputs the chord of the plurality of inaudible sounds corresponding to the stream of bits of the first half of the user ID and a sound effect from the speaker 26 for a predetermined time (e.g., for a second). Then, the information processing terminal 2 outputs the chord of the plurality of inaudible sounds corresponding to the stream of bits of the second half of the user ID and a sound effect from the speaker 26 for a predetermined time (e.g., for a second). It should be noted that in the period of the first half (the period in which the plurality of inaudible sounds corresponding to the stream of bits of the first half of the user ID are output) and the period of the second half (the period in which the plurality of inaudible sounds corresponding to the stream of bits of the second half of the user ID are output), the same sound effect may be output, or different sound effects may be output. Further, the information processing terminal 2 outputs BGM (background music) during the execution of the game application. However, when outputting the inaudible sounds, the information processing terminal 2 outputs a sound effect different from the BGM output during the execution of the game application. In this case, the information processing terminal 2 may make the sound volume of the inaudible sounds greater than the sound volume of the BGM. Further, the information processing terminal 2 may make the sound volume of the inaudible sounds greater than the sound volume of the sound effect to be output with the inaudible sounds. By making the sound volume of the inaudible sounds great, it is possible to make it easy for the receiver side of the inaudible sounds to detect the inaudible sounds. Further, while outputting the inaudible sounds and the sound effect, the information processing terminal 2 displays on the display section 24 an image indicating that data is being transmitted.

In the exemplary embodiment, the sound effect (an audible sound; a sound of a frequency easy for a person to hear; e.g., a sound of 2000 to 4000 Hz) is output by superimposing the sound effect on the inaudible sounds. That is, the inaudible sounds and the sound effect are output such that the output period of the inaudible sounds and the output period of the sound effect overlap each other. The sound effect is output when the inaudible sounds are output, whereby it is possible to inform the user that data is being transmitted through the inaudible communication. Thus, it is possible to enhance a representation effect. Further, the sound effect is output by superimposing the sound effect on the inaudible sounds, whereby the sound effect is easier for even a user capable of hearing a sound near 18 kHz, for example, to hear than the inaudible sounds. Thus, it is possible to make the inaudible sounds difficult to hear.

It should be noted that the inaudible sounds and the sound effect may be output such that the entirety of the output period of the inaudible sounds and the entirety of the output period of the sound effect overlap each other. Alternatively, the inaudible sounds and the sound effect may be output such that a part of the output period of the inaudible sounds and a part of the output period of the sound effect overlap each other. Further, the sound effect does not necessarily need to be output by superimposing the sound effect on the inaudible sounds. For example, after the output period of the sound effect ends, the inaudible sounds may be output. Alternatively, after the output period of the inaudible sounds ends, the sound effect may be output.

After the output of the inaudible sounds ends in step S123, the information processing terminal 2 displays a sound reception screen for causing the user to give an instruction to receive a sound (step S124).

When the determination is NO in step S121, or when step S124 is executed, the information processing terminal 2 determines whether or not an instruction to receive a sound is given by the user (step S125). The information processing terminal 2 waits until an instruction to receive a sound. It should be noted that when the user cancels the addition of a friend here, the information processing terminal 2 ends the processing shown in FIG. 12.

When an instruction to receive a sound is given (step S125: YES), the information processing terminal 2 attempts to detect inaudible sounds using the microphone 25 for a predetermined time. When the information processing terminal 2 detects inaudible sounds, the information processing terminal 2 acquires the user ID of the partner from the detected inaudible sounds (step S126). Specifically, the information processing terminal 2 breaks down the detected inaudible sounds into frequency components using, for example, Fast Fourier Transform and distinguishes transmitted data using the sound conversion table shown in FIG. 8. It should be noted that when the information processing terminal 2 does not detect inaudible sounds or does not distinguish the user ID in step S126, the information processing terminal 2 displays an error screen, and the information processing terminal 2 ends the processing shown in FIG. 12. The error screen displayed here may display letters for causing the user to confirm whether or not the sound volume of the terminal of the partner is sufficient.

After step S126, the information processing terminal 2 accesses the server 3 and acquires user information corresponding to the distinguished user ID of the partner (step S127). For example, when the information processing terminal 2A receives the user IDb from the information processing terminal 2B in step S126, then based on the user IDb, the information processing terminal 2A acquires the user name of the user B and an image of the user character PCb from the server 3. Then, the information processing terminal 2A displays the acquired user information on the display section 24 (step S128). In step S128, together with the acquired user information, an image for allowing the user to select whether or not to transmit a friend request to establish a friend relationship with this user are displayed.

Next, the information processing terminal 2 determines whether or not an instruction to transmit a friend request is given by the user on the image displayed in step S128 (step S129). When an instruction to transmit a friend request is given by the user (step S129: YES), the information processing terminal 2 transmits the friend request to the server 3 (step S130). This friend request includes the user ID of the partner with whom a friend relationship is to be established (the user ID acquired in step S126). When, on the other hand, an instruction not to transmit a friend request is given (step S129), the information processing terminal 2 ends the processing shown in FIG. 12.

When the server 3 receives the friend request from the information processing terminal 2, then based on the user ID of the user having transmitted the friend request and the user ID of the partner included in the friend request, the server 3 determines whether or not a friend request is also transmitted from the partner. For example, when a friend request from the user A to the user B is transmitted in the above step S130, the server 3 determines whether or not a friend request from the user B to the user A has already been transmitted. Then, when a friend request is also transmitted from the partner (the user B), the server 3 transmits, to the user A (the information processing terminal 2A), information indicating that a friend relationship is established. When, on the other hand, a friend request has not yet been transmitted from the partner (the user B), the server 3 transmits, to the user A (the information processing terminal 2A), information indicating that a friend relationship is not established.

After step S130, based on the information transmitted from the server 3, the information processing terminal 2 determines whether or not a friend request is also received from the partner (step S131). When a friend request is also received from the partner (step S131: YES), i.e., when information indicating that a friend relationship is established is received from the server 3, the information processing terminal 2 displays a friend addition completion screen (step S132), and the information processing terminal 2 ends the processing in FIG. 12.

When, on the other hand, a friend request is not transmitted from the partner (step S131: NO), i.e., when information indicating that a friend relationship is not established is received from the server 3, the process of step S121 is executed next.

It should be noted that when step S121 is executed after the determination is NO in step S131, the information processing terminal 2 executes the processes of steps S122 and S123 in accordance with an instruction from the user. In this case, after the process of step S123 ends, the information processing terminal 2 does not execute the process of step S124, and ends the processing in FIG. 12 (i.e., when the information processing terminal 2 transmits the user ID to the partner after receiving the user ID of the partner, the information processing terminal 2 does not perform the process of receiving the user ID from the partner again).

(Game Processing)

Figure 13:
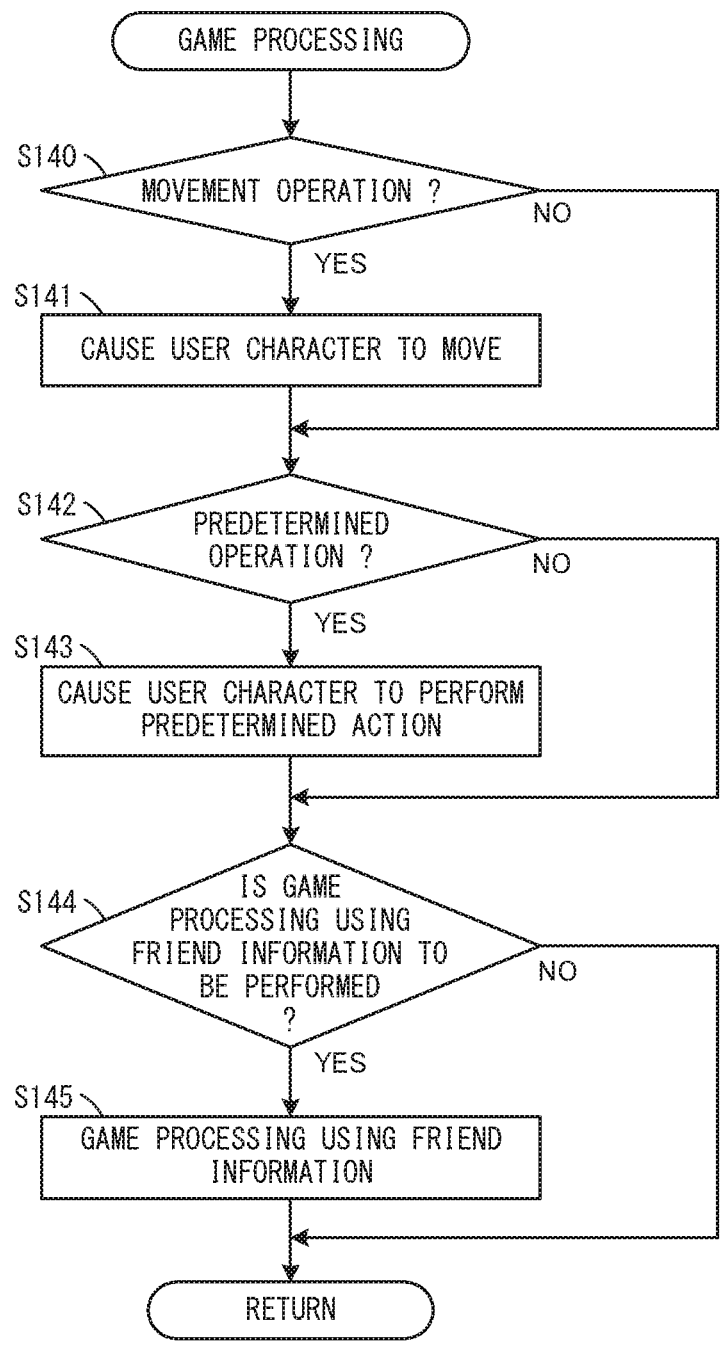
FIG. 13 is an example non-limiting flow chart showing the details of game processing in step S107.

Next, the details of the game processing in step S107 in FIG. 11 are described. FIG. 13 is a flow chart showing the details of the game processing in step S107.

First, based on operation data, the information processing terminal 2 determines whether or not a movement operation is performed (step S140). When it is determined that a movement operation is performed (step S140: YES), the information processing terminal 2 causes the user character to move in the game space (step S141).

When the determination is NO in step S140, or when the process of step S141 is executed, the information processing terminal 2 determines whether or not a predetermined operation is performed by the user (step S142). Here, the predetermined operation is an operation for causing the user character to perform a predetermined action (e.g., the action of talking to another character, the action of acquiring an item, the action of paying money, or the like in the game space).

When it is determined that the predetermined operation is performed by the user (step S142: YES), the information processing terminal 2 causes the user character to perform the predetermined action corresponding to the operation (step S143). As a result, for example, the user character talks to another character or acquires an item.

When the determination is NO in step S142, or when the process of step S143 is executed, the information processing terminal 2 determines whether or not game processing using friend information is to be performed (step S144). Here, the friend information is information regarding a friend of the user of the information processing terminal 2 and includes the number of friends and user information of a friend (information such as the user name and the user character of the friend and an item owned by the friend). For example, when the user gives an instruction to execute a special stage that can be executed when the number of friends is equal to or greater than a predetermined number, the determination is YES in step S144. Further, when the user gives an instruction to purchase an item owned by a particular friend, the determination is YES in step S144.

When it is determined that the game processing using the friend information is to be performed (step S144: YES), the information processing terminal 2 executes the game processing using the friend information (step S145). For example, the information processing terminal 2 executes the game at the special stage described above. Further, for example, when, in the information processing terminal 2A, the user A gives an instruction to purchase an item owned by a particular friend (the user B), the information processing terminal 2A displays the item owned by the friend (the user B). When the user A gives an instruction to purchase the item, the user A acquires the item owned by the user B. The server 3 adds the item purchased from the user B to items owned by the user A and also decreases money owned by the user A. Further, the server 3 increases money owned by the user B.

When the determination is NO in step S144, or when the process of step S145 is executed, the information processing terminal 2 ends the processing in FIG. 13.

(Server Processing)

Figure 14:
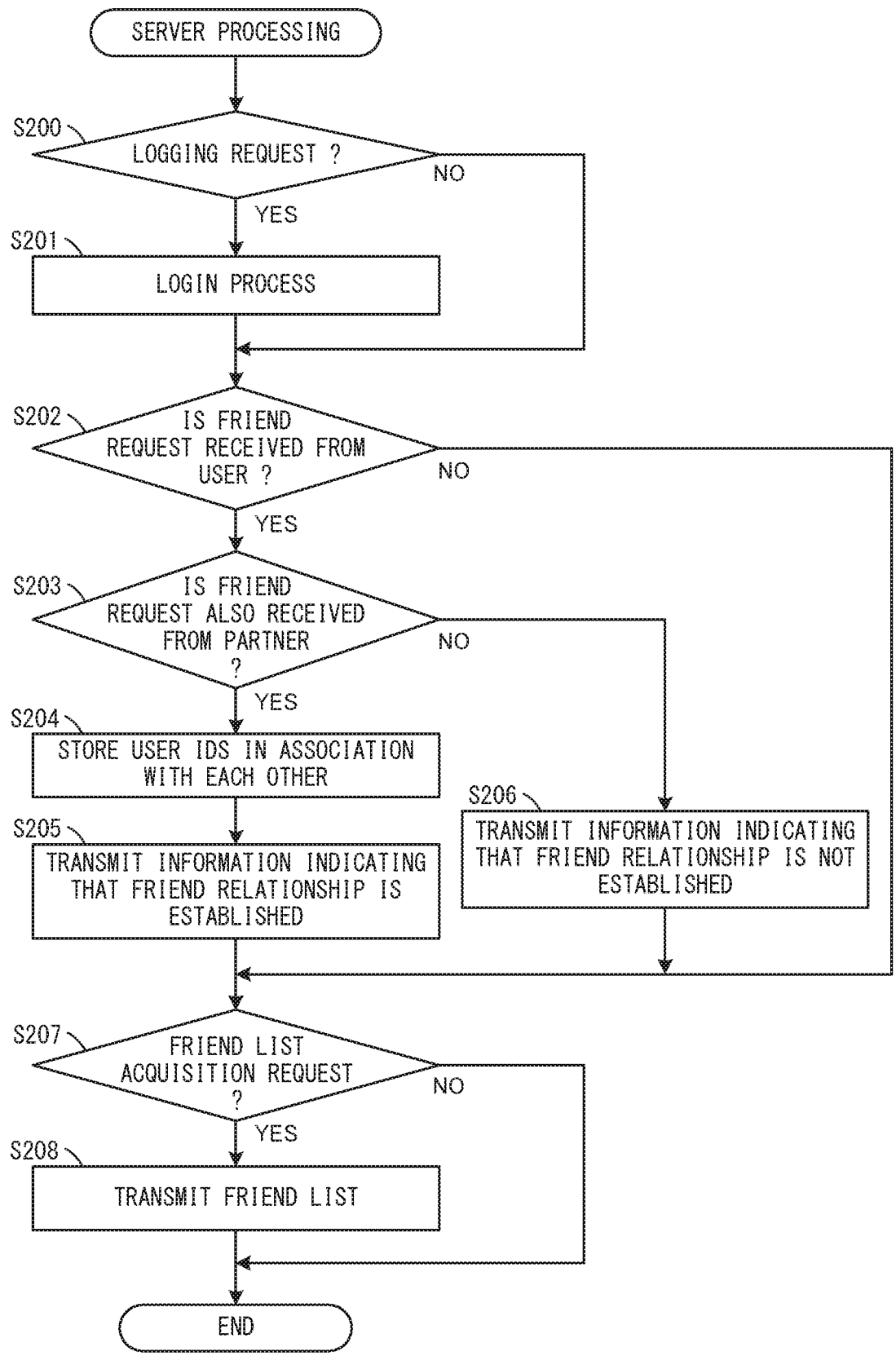
FIG. 14 is an example non-limiting flow chart showing the details of the processing performed by the server 3.

Next, a description is given of the details of the processing performed by the server 3. FIG. 14 is a flow chart showing the details of the processing performed by the server 3. The processing shown in FIG. 14 is performed by the processor of the server 3 executing a predetermined program. It should be noted that the server 3 repeatedly executes the processing shown in FIG. 14 at predetermined time intervals.

First, the server 3 determines whether or not a login request is received from the information processing terminal 2 (step S200). When a login request is received from the information processing terminal 2 (step S200: YES), the server 3 executes a login process (step S201). Here, based on the user ID transmitted from the information processing terminal 2, the server 3 determines whether or not the user ID is registered in advance. Then, the server 3 determines whether or not a login is permitted. When a login is permitted, the server 3 transmits information necessary for the game described above to the information processing terminal 2.

When the determination is NO in step S200, or when the process of step S201 is executed, the server 3 determines whether or not a friend request is received from the user (the information processing terminal 2) (step S202). When a friend request is received from the user (step S202: YES), the server 3 determines whether or not a friend request is also received from the partner (step S203). The server 3 stores a friend request transmitted from each information processing terminal 2. For example, when the determination is YES in step S202 in accordance with the reception of "a friend request from the user A to the user B" from the information processing terminal 2A, then in step S203, the server 3 determines whether or not "a friend request from the user B to the user A" has already been received from the information processing terminal 2B.

When it is determined that a friend request is also received from the partner (step S203: YES), the server 3 stores the user IDs in association with each other in the storage device (step S204). For example, when a friend request from the user A to the user B is received, and a friend request from the user B to the user A is received, the server 3 stores the user IDa of the user A in association with the user IDb of the user B and also stores the user IDb of the user B in association with the user IDa of the user A. Then, the server 3 transmits, to the user A (the information processing terminal 2A) having transmitted the friend request, information indicating that a friend relationship is established (step S205).

When, on the other hand, it is not determined that a friend request is also received from the partner (step S203: NO), the server 3 transmits, to the user A (the information processing terminal 2A) having transmitted the friend request, information indicating that a friend relationship is not established (step S206).

When the determination is NO in step S202, or when the process of step S205 is executed, or when the process of step S206 is executed, the server 3 determines whether or not a friend list acquisition request is received from the information processing terminal 2 (step S207).

When a friend list acquisition request is received (step S207: YES), the server 3 transmits a friend list to the information processing terminal 2 having transmitted the friend list acquisition request (step S208). This friend list includes friend information (the user name, an image of the user character, and the like) of each friend.

When the determination is NO in step S207, or when the process of step S208 is executed, the server 3 ends the processing shown in FIG. 14.

It should be noted that in accordance with a request from the information processing terminal 2 in addition to the processing described above, the server 3 performs the process of transmitting data for use in game processing (e.g., data of a character, data of an item, data of a game space, and the like) to the information processing terminal 2. During the execution of the game, the information processing terminal 2 transmits to the server 3 an acquisition request to acquire data for use in the game processing, and in accordance with the acquisition request, the server 3 transmits the data to the information processing terminal 2.

It should be noted that the processing performed by the information processing terminal 2 and the server 3 described above is a mere example. Alternatively, the order of processes may be changed, or a part of the above processing may be omitted.

As described above, in the exemplary embodiment, information processing terminals 2 exchange user IDs through the inaudible communication. Based on the user ID acquired from the partner, each information processing terminal 2 transmits a friend request to the server 3. When the server 3 receives friend requests from both the information processing terminals 2, the server 3 stores the user IDs of the users in association with each other. In the exemplary embodiment, the user IDs are exchanged using the inaudible communication. Thus, each user can easily establish a friend relationship with the partner without needing to input the user ID of the partner by hand or capture an image corresponding to the user ID of the partner with a camera.

Further, for example, it is also possible to exchange user IDs by performing communication using a radio wave, such as a wireless LAN or Bluetooth (registered trademark). However, in such communication using a radio wave, there is a risk that a third person different from the partner with whom the user attempts to establish a friend relationship learns the user ID. In contrast, the communication range of the inaudible communication is smaller than communication using a radio wave, such as a wireless LAN or Bluetooth (registered trademark). Thus, it is possible to reduce the risk that a third person different from the partner with whom the user attempts to establish a friend relationship learns the user ID.

Further, in the exemplary embodiment, for example, the information processing terminal 2A outputs inaudible sounds, whereby the user A transmits the user IDa to the user B (the information processing terminal 2A executes step S123). Then, subsequently, the information processing terminal 2A receives inaudible sounds, thereby receiving the user IDb from the user B (the information processing terminal 2A executes step S126 after step S123). Thus, in a serial flow, user IDs can be exchanged, and the user A and the user B can transmit friend requests to the server 3.

Further, in the exemplary embodiment, in a case where the user A and the user B establish a friend relationship, a friend relationship between the user A and the user B is established when both the user A and the user B transmit friend requests to the server 3. That is, a user does not unilaterally register another user as a friend, but a friend relationship is established by the intentions of both users. Thus, each user can register a friend with a sense of security.

Further, in the exemplary embodiment, for example, when the information processing terminal 2A receives the user IDb of the user B from the information processing terminal 2B, then based on the received user IDb, the information processing terminal 2A acquires the user information (the user name, the user character, and the like) of the user B from the server 3. Consequently, the user A can confirm detailed information of the user B and confirm that the partner to be registered as a friend is the user B. For example, when another information processing terminal 2C different from the information processing terminal 2B is present around the information processing terminal 2A, there is a case where the information processing terminal 2A receives the user ID from the information processing terminal 2C through the inaudible communication. However, by acquiring user information corresponding to the received user ID from the server 3 through the inaudible communication, the user A can confirm whether or not the received user ID is that of the user B to be registered as a friend.

Further, a user ID is received through the inaudible communication, and user information corresponding to the received user ID is acquired from the server 3. Thus, it is only necessary to receive relatively small data through the inaudible communication. It is possible to provide a user with sufficient information of the partner to be registered as a friend.

Further, in the exemplary embodiment, the information processing terminal 2 outputs an inaudible sound from the speaker, thereby transmitting the user ID. Thus, the information processing terminal 2 can simultaneously transmit the user ID to a plurality of other terminals present around the information processing terminal 2. For example, the information processing terminal 2A can simultaneously transmit the user IDa of the user A to the plurality of terminals 2B and 2C around the information processing terminal 2A. Based on the received user IDa, each of the terminals 2B and 2C performs the processing described above and transmits a friend request to the server 3. Next, the information processing terminal 2A receives the user IDb from the terminal 2B through the inaudible communication and transmits a friend request to establish a friend relationship with the user B of the terminal 2B. Further, the information processing terminal 2A receives the user IDc from the terminal 2C through the inaudible communication and transmits a friend request to establish a friend relationship with the user C of the terminal 2C. Consequently, the user A of the information processing terminal 2A can establish friend relationships with the user B and the user C.

Further, in the exemplary embodiment, when an inaudible sound is output, a sound effect (an audible sound) is output. Thus, it is possible to cause the user to easily recognize that the inaudible communication is performed. Further, the sound effect is output by superimposing the sound effect on the inaudible sound. Thus, it is possible to cause the user to recognize the period in which the inaudible communication is performed.

Further, in the exemplary embodiment, when an inaudible sound is output, a sound effect is output by superimposing the sound effect on the inaudible sound. Thus, it is possible to make the inaudible sound difficult for even a user capable of hearing the inaudible sound to hear. Further, a sound effect is output by superimposing the sound effect on the inaudible sound. Thus, even if the frequency of the inaudible sound for use in the inaudible communication is lowered to some degree (e.g., even if the frequency is lowered to such a degree that a person who hears well can slightly hear the inaudible sound), it is possible to make the inaudible sound difficult for the user to hear. Thus, it is possible to widen the range of the frequency of the inaudible sound for use in the inaudible communication. Thus, it is possible to improve the communication speed and also avoid giving a sense of discomfort or a sense of unpleasantness to the user.

(Variation)

While the exemplary embodiment has been described above, various variations may be made in another exemplary embodiment.

Figure 15:
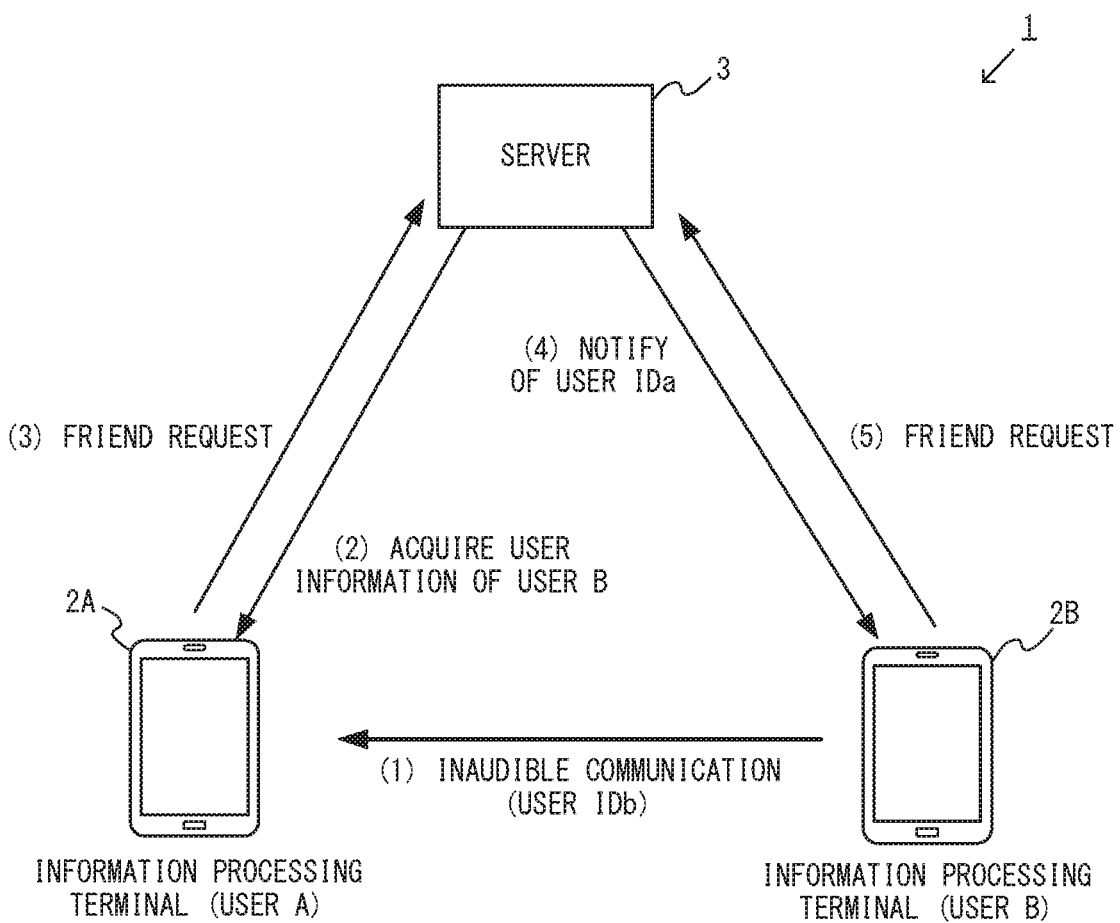
FIG. 15 is an example non-limiting diagram showing an example of the flow until a friend relationship is established in another exemplary embodiment.

For example, in the above exemplary embodiment, the information processing terminal 2A and the information processing terminal 2B exchange the user IDs through the inaudible communication. In another exemplary embodiment, for example, the information processing terminal 2A may acquire the user IDb of the user B from the information processing terminal 2B through the inaudible communication, and the information processing terminal 2B may acquire the user IDa of the user A by another method. FIG. 15 is a diagram showing an example of the flow until a friend relationship is established in another exemplary embodiment.

As shown in FIG. 15, first, (1) the information processing terminal 2A acquires the user IDb of the user B from the information processing terminal 2B through the inaudible communication. Next, based on the acquired user IDb, the information processing terminal 2A transmits to the server 3 an acquisition request to acquire user information of the user B, and (2) the information processing terminal 2A acquires the user information of the user B from the server 3. The user A of the information processing terminal 2A confirms the user information of the user B and (3) transmits a friend request to the server 3. The server 3 (4) notifies the information processing terminal 2B that a friend request is received from the information processing terminal 2A. This notification includes the user IDa of the information processing terminal 2A and user information corresponding to the information processing terminal 2A. The user B of the information processing terminal 2B confirms the user information of the user A. Then, the information processing terminal 2B (5) transmits a friend request (approval for the friend request from the information processing terminal 2A) to the server 3. As described above, the information processing terminal 2A can receive the user ID from the information processing terminal 2B through the inaudible communication and then transmit the user ID and the user information of the information processing terminal 2A to the information processing terminal 2B via the server 3. Thus, it is possible to establish a friend relationship between the user A and the user B.

Further, the above communication using an inaudible sound is a mere example. Alternatively, communication using an inaudible sound may be performed by another method. For example, in the above exemplary embodiment, data is transmitted by simultaneously outputting a plurality of inaudible sounds for a predetermined time. In another exemplary embodiment, data may be transmitted by sequentially outputting a single inaudible sound corresponding to a single piece of data. For example, a sound of a frequency of 18 kHz is caused to correspond to data "00", a sound of a frequency of 18+α kHz is caused to correspond to data "01", a sound of a frequency of 18+2α kHz is caused to correspond to data "10", and a sound of a frequency of 18+3α kHz is caused to correspond to data "11". In this case, when data "110010" is transmitted, first, a sound of a frequency of 18+3α kHz may be output, and next, a sound of a frequency of 18 kHz may be output. Further, then, a sound of a frequency of 18+2α kHz may be output.

Further, in the above exemplary embodiment, when the information processing terminal 2 acquires a user ID from another terminal, the information processing terminal 2 acquires information such as a user name, a user character, and the like as user information corresponding to the acquired ID from the server 3. The user information acquired from the server 3 is not limited to this. For example, as the user information, information such as the level of the user, an item and equipment such as a weapon owned by the user, and the gender of the user in addition to the user name, the user character, and the like may be acquired from the server 3.

Further, in the above exemplary embodiment, information processing terminals 2 exchange user IDs through the inaudible communication and acquire user information (a user name, a user character, and the like) corresponding to the user IDs from the server 3. In another exemplary embodiment, information processing terminals 2 may exchange user names, user characters, and the like in addition to (or instead of) user IDs through the inaudible communication. Each information processing terminal 2 may display the user name and the user character received from the partner, and in accordance with an instruction from the user, transmit a friend request to the server 3.

Further, in the above exemplary embodiment, for example, after the information processing terminal 2B transmits the user ID to the information processing terminal 2A through the inaudible communication, the information processing terminal 2A transmits the user ID to the information processing terminal 2B through the inaudible communication. In another exemplary embodiment, the transmission of the user ID from the information processing terminal 2B to the information processing terminal 2A and the transmission of the user ID from the information processing terminal 2A to the information processing terminal 2B may be simultaneously performed through the inaudible communication. For example, the transmission from the information processing terminal 2B to the information processing terminal 2A is performed using an inaudible sound of a frequency in a certain range, and the transmission from the information processing terminal 2A to the information processing terminal 2B is performed using an inaudible sound of a frequency in another range, whereby it is possible to simultaneously perform communication in both directions. Further, for example, there is a case where the information processing terminal 2 detects, with the microphone of the information processing terminal 2, an inaudible sound output from the speaker of the information processing terminal 2. The information processing terminal 2 may cancel (eliminate) the inaudible sound output from the speaker of the information processing terminal 2 itself, thereby detecting only an inaudible sound output from the partner. Consequently, the two information processing terminals 2 can simultaneously perform communication in both directions.

Further, in the above exemplary embodiment, as the frequency of the inaudible sound for use in the inaudible communication, a sound of a high frequency (e.g., 18 kHz or higher) that cannot be heard by a person or is difficult for a person to hear is used. Alternatively, in another exemplary embodiment, as the frequency of the inaudible sound for use in the inaudible communication, a sound of a low frequency (e.g., 100 Hz or higher) that cannot be heard by a person or is difficult for a person to hear may be used.

Further, in the above exemplary embodiment, when the sound volume of the speaker of the information processing terminal 2 is set to "0", the inaudible sounds are not output, either. Alternatively, in another exemplary embodiment, even when the sound volume of the speaker is set to "0", the inaudible sounds may be forcibly output. In this case, only the inaudible sounds may be forcibly output, and the sound effect (an audible sound) may not be forcibly output. For example, when the sound volumes of the BGM in the game application and the sound effect are set to "0", the BGM and the sound effect may not be output, while the inaudible sounds may be forcibly output.

Further, information of the friend relationship between users is stored in the storage device of the server 3. Here, the storage device included in the server 3 may be a storage device built into the server 3, or a storage device externally attached to the server 3, or a storage device connectable by the server 3 via a network (a LAN, a WAN, the Internet, or the like).

Further, the server 3 may include a single server apparatus, or may include a plurality of server apparatuses.

Further, the above game is a mere example, and any other game may be performed.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system including a first terminal operated by a first user, a second terminal operated by a second user, and a server capable of communicating with the first terminal and the second terminal, wherein
the first terminal is configured to:
using inaudible sound, transmit first identification information identifying the first user, and
based on transmitting the first identification information, display, on a display screen, an instruction to the first user related to a first audible sound,
the second terminal is configured to:
receive, from the first terminal, the first identification information transmitted using inaudible sound,
based on receiving the first identification information from the first terminal, superimpose inaudible sound corresponding to second identification information for identifying the second user on audible sound;
output, as the first audible sound, the audible sound having the superimposed inaudible sound; and transmit, to the server, a first request to store information associating the first user and the second user,
the first terminal is configured to:
transmit a second request to the server for storing information associating the first user and second user, and
the server is configured to:
based on receiving the first request and the second request, storing the information associating the first user and the second user in a storage.

2. An information processing apparatus capable of communicating with a server, the information processing apparatus comprising:
a sound output device;
a sound input device;
communication circuitry; and
a processor configured to:
control the sound output device to output, using inaudible sound, first identification information identifying a first user of the information processing apparatus;
based on outputting the first identification information, control a display to display an instruction to the first user related to a first audible sound;
control the microphone to receive the first audible sound transmitted from another information processing apparatus used by a second user, the first audible sound having second identification information superimposed on audible sound and the second identification identifying the second; and
control the communication circuitry to, based on receiving the second identification information from the other information processing apparatus, transmit to the server, a first request for the server to store information associating the first user and the second user based on the server receiving a second request for storing the information from the other information processing apparatus.

3. A non-transitory storage medium having stored therein an information processing program executable by a processor of an information processing apparatus capable of communicating with a server and comprising a sound output device, a sound input device, and communication circuitry, the information processing program, when executed by the processor, causing the processor to execute:
controlling the sound output device to output, using inaudible sound, first identification information identifying a first user of the information processing apparatus;
based on outputting the first identification information, control a display to display an instruction related to a first audible sound
control the microphone to receive the first audible sound transmitted from another information processing apparatus used by a second user, the first audible sound having second identification information superimposed on audible sound and the second identification information identifying the second user; and
control the communication circuitry to, based on receiving the second identification information from the other information processing apparatus, transmit, to the server, a first request for the server to store information associating the first user and the second user based on the server receiving a second request for storing the information from the other information processing apparatus.

4. The information processing system according to claim 1, wherein the first and second requests are friend requests.

5. The information processing system according to claim 1, wherein at least one of the first and second terminals comprises a smartphone.

6. The information processing system according to claim 1, wherein at least one of the first and second terminals comprises a mobile game apparatus.

7. The information processing apparatus according to claim 2, wherein the sound output device comprises a speaker and the sound input device comprises a microphone.

8. The information processing apparatus according to claim 2, wherein the first and second requests are friend requests.

9. The information processing apparatus according to claim 2, wherein the inaudible sound is 18 kHz or higher.

10. The information processing apparatus according to claim 2, wherein the information processing apparatus comprises a smartphone.

11. The information processing apparatus according to claim 2, wherein the information processing apparatus comprises a mobile game apparatus.

12. The information processing apparatus according to claim 2, wherein the information associating the first user and the second user comprises the first and second identification information.

13. The information processing apparatus according to claim 2, wherein the processor is configured to control the communication circuitry to transmit the first request in response to an input to the information processing apparatus.

14. The information processing apparatus according to claim 2, wherein the processor in configured to control the microphone to receive the first audible sound in response to an input to the information processing apparatus based on the instruction.

15. The information processing apparatus according to claim 2, further comprising:
a memory configured to store conversion information associating data values and inaudible sounds,
wherein the processor is generate the inaudible sound for outputting the first identification information using the conversion information.

16. The information processing apparatus according to claim 15, wherein the first identification information comprises a plurality of bits and the conversion information associates bit values and inaudible sound frequencies.

17. The non-transitory storage medium according to claim 3, wherein the information processing program causes the processor to further execute:
- accessing a memory of the electronic device storing conversion information associating data values and inaudible sounds; and
- generating the inaudible sound for outputting the first identification information using the accessed conversion information.

18. The non-transitory storage medium according to claim 17, wherein the first identification information comprises a plurality of bits and the conversion information associates bit values and inaudible sound frequencies.

19. An information processing apparatus comprising:
- the non-transitory storage medium according to claim 3; and
- a processor configured to access the information processing program stored in the non-transitory storage medium.

* * * * *